Nov. 5, 1929.                J. F. WHITE                1,734,282
                             HOOD LATCH
                     Original Filed April 27, 1921
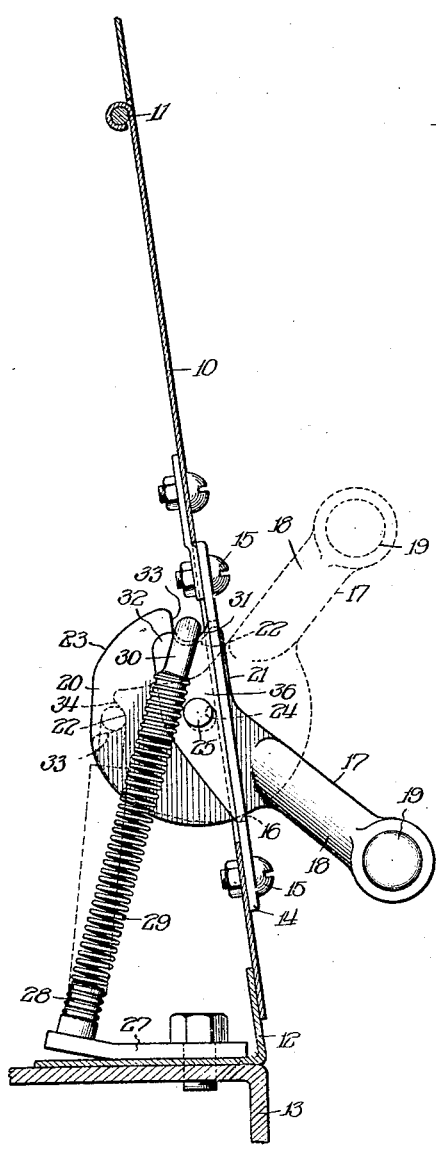
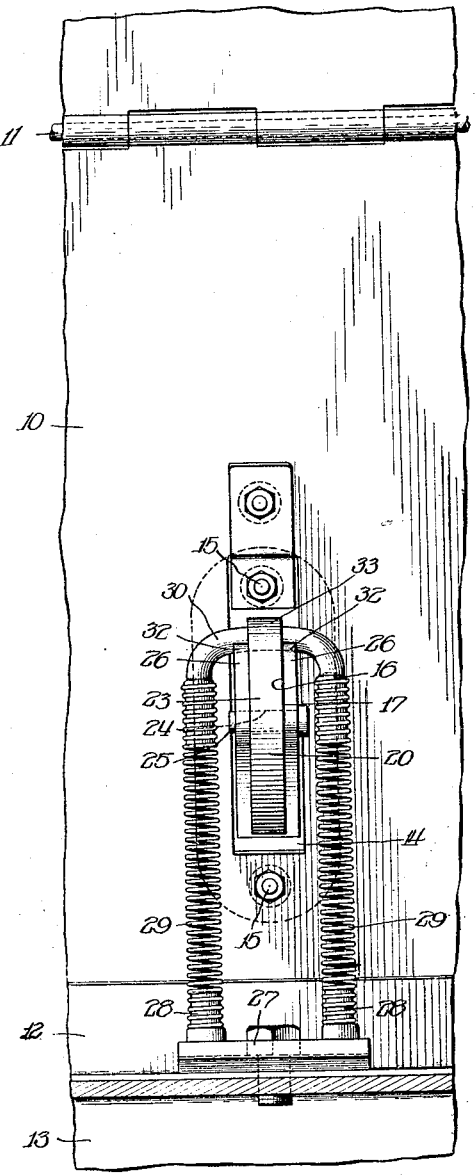
Witness:
A. Burkhardt
Inventor:
John F. White,
By Cromwell, Greist & Warden
Attys.

Patented Nov. 5, 1929

1,734,282

UNITED STATES PATENT OFFICE

JOHN F. WHITE, OF CHICAGO, ILLINOIS, ASSIGNOR TO WHITE PRODUCTS CO., OF CHICAGO, ILLINOIS, A CORPORATION OF ILLINOIS

HOOD LATCH

Original application filed April 27, 1921, Serial No. 464,282. Divided and this application filed June 27, 1923. Serial No. 648,166.

The present invention pertains in general to latches, and contemplates specifically the provision of a novel hood latch for motor vehicles.

The principal purpose of the invention, broadly stated, is the provision of such a latch which is of a simple, durable, construction, which is easily manipulated, and which is characterized by an extremely pleasing inconspicuous appearance.

One of the most salient features of the latch lies in its efficient manner of operation, wherein the strong spring tension provided for maintaining the hood in its fastened position is applied thereto without effort by a progressively increasing leverage through the fulcrumed movement of the latch handle.

Another important feature resides in the automatic interlocking of the component latch portions and associated keeper under the previously mentioned spring tension, whereby forces tending to raise the hood when the same is fastened merely result in a more secure locking of the latching means.

Other advantages present in this invention will be appreciated as the nature of the same is better understood from the following description and accompanying drawings wherein is set forth what is now considered to be a preferred embodiment of the invention. The particular embodiment disclosed is merely illustrative, however, and is not intended to be construed as a restriction on the spirit of the invention or as an unnecessary limitation of the scope of the claims.

In the drawings—

Fig. 1 is a side elevation of the latch in its fastened position, showing in section the adjacent hood and chassis portions; and Fig. 2 is a rear elevation of the latch and keeper as viewed from within the hood.

Referring in detail to the drawings, it will be observed that the side of the hood 10 which is hinged to the upper portion of the same at 11 contacts, when lowered into the closed position illustrated, against an upwardly bent flange 12 of a positioning strip carried by the chassis 13 of the vehicle.

An escutcheon plate 14 is secured to the outer side of the hood by bolts 15. A narrow vertical rectangular slot 16 is cut in the plate and hood, and receives the hook member 17 of the latch. The hook member 17 comprises a stem 18 which is provided at its outer end with a transverse handle 19, and, at its inner end, with a flat head 20 of substantially semi-circular shape. The straight edge 21 of this semi-circular head lies at an obtuse angle to the axis of the stem 18 and, when the hood is closed and the latch fastened, substantially fills the slot 16 flush with the plate 14. A deep angular notch 22 is cut in the curved edge 23 of the head 20 adjacent the top of the straight edge 21, and constitutes a keeper-engaging hook.

An aperture 24 is formed in the head 20 and provides a pivotal fulcruming bearing for the hook member 17 on a transverse pin 25 which is journaled at both its ends in ears 26 which are preferably formed as integral inward projections from the plate 14 which borders the slot 16 on the outer face of the side of the hood 10.

The keeper of the latching device comprises a plate 27 which is bolted at one end to the chassis, and is bent slightly upward at its other end and there provided with two spaced threaded cylindrical lugs 28. Spiral springs 29, the coils of which when unstressed are substantially closed, telescope over the lugs and are secured thereto in threaded engagement with the same. The springs extend upwardly at the same slightly oblique angle as the lugs and are secured in a similar manner about the downwardly depending ends of an inverted U-shaped yoke 30. The lugs 28 constitute guiding means effective to maintain the springs in proper position to present the yoke for engagement by the latch. The yoke, when not pulled upwardly by the co-acting hooking member 17 against the resistance of the coil springs 29, is normally supported by the springs at approximately the height of the pin 25, being deflected and pressed laterally inward by the head 20, as shown in dotted lines in Fig. 1. When the hood is not in its closed position, however, the resilient construction of the keeper causes the spring sides thereof to assume a position co-axial with that occupied when in its fastened and consequently stressed position.

It will, of course, be understood that, while this particular kind of keeper is disclosed, any keeper having similarly flexible and yielding properties may be employed with equal success.

The upper surfaces of the ears 26, which support the ends of the pin 25, are provided with laterally aligned notches 31 which are adapted to receive the yoke 30 of the then stretched keeper when the latch is in its fastened position, as shown in full lines in Figs. 1 and 2.

The deep angular notch 22 of the head 20 is adapted to engage the yoke 30 of the keeper and raise it into a position against the shoulders 32 which constitute the sides of the notches 31 most removed from the general plane of the side of the hood 10, whereupon a slight further movement of the notch 22 and contained yoke 30 toward the ears 26 by the continued downward movement of the latch handle 17 causes the yoke to cam over said shoulders 32 and become firmly seated in the notches 31 on the far side thereof.

The bottoms of the notches 31 and 22 are disposed at substantially the same distances above the pivoting pin 25 whereby to eliminate any play of the hooking member 17 when the latch is in its fastened position. Both sides 33 and 34 of the notch 22 are, of course, a greater distance above the pin 25 than the shoulders 32 of the ears 26 in order that upon pivotal movement of the head 20 in either direction one of the sides 33 or 34 of the notch will engage the keeper and cause the same to cam into or out of the notches 31 over the shoulders 32.

While the edge 23 of the head 20 has been referred to as curved and the head 20 has been referred to as semi-cylindrical, the contour of the head 20, which includes the edge 23, may be of any shape which will, in its downward movement, serve to cam the yoke 30 outwardly whereby to assume a position wherein it may subsequently snap inwardly into the notch 22. It will be noted that the angle formed by the yoke-engagaing notch in the head 20, the fulcruming point at the pivot pin and the handle, is obtuse. This construction results in an increased leverage applied in latching the device commensurate with the increasing resistance of the keeper as the latter is stressed into the fastened position.

This application is a division of my copended application, Serial No. 464,882, which was filed on April 27, 1921, and was issued on July 1, 1924, as Patent No. 1,499,895.

I claim:

1. In a hood latch, a keeper-engaging element mounted on the inside of the hood, a resilient keeper, and means separate from the keeper and element and operable from exteriorly of the hood to bring the keeper and the element into interlocked engagement.

2. In a hood latch, a keeper-engaging element fixedly mounted on the inside of the hood, a resilient keeper, and means operable from exteriorly of the hood to bring the keeper and the element into interlocked engagement.

3. In a hood latch, a bracket fixedly mounted on the inside of the hood and provided with a notch, a resilient keeper, and a hooking member passing through an aperture in the hood adjacent the bracket and provided exteriorly of the hood with an operating handle and interiorly of the hood with a portion for hooking the keeper over the bracket into the notch in the same.

4. In a hood latch, a bracket fixedly mounted on the inside of the hood and provided with an upwardly facing notch in the upper portion thereof, a resilient keeper, and a pivotally mounted hooking member passing through an aperture in the hood adjacent the bracket and provided exteriorly of the hood with an operating handle and interiorly of the hood with a portion for hooking the keeper over the bracket into the notch in the same upon the handle being depressed.

5. In a hood latch, a bracket fixedly mounted on the inside of the hood and characterized by two spaced inwardly extending ears having upwardly facing notches in the upper portions thereof, a resilient keeper provided with a yoke adapted to span both ears and seat in both notches, and a hooking member passing through an aperture in the hood adjacent the ears and pivotally mounted intermediate its ends between the ears on a transverse pin carried thereby, said member being provided exteriorly of the hood with an operating handle adapted for movement in a vertical plane and interiorly of the hood with a hook portion adapted to hook under the yoke of the keeper and raise the same up over the ears into the notches thereof, the bracket and keeper being latched when the handle of the member is moved downwardly and being unlatched when the handle of the member is moved upwardly.

In testimony whereof I have hereunto signed my name.

JOHN F. WHITE.